(12) United States Patent
Laporte

(10) Patent No.: US 12,285,830 B2
(45) Date of Patent: Apr. 29, 2025

(54) SPINDLE WITH PIEZOELECTRIC ACTUATORS

(71) Applicant: MITIS, Bouguenais (FR)

(72) Inventor: Sylvain Laporte, Orvault (FR)

(73) Assignee: MITIS, Bouguenais (FR)

( * ) Notice: Subject to any disclaimer, the term of this patent is extended or adjusted under 35 U.S.C. 154(b) by 698 days.

(21) Appl. No.: 17/616,848

(22) PCT Filed: Apr. 17, 2020

(86) PCT No.: PCT/EP2020/060815
§ 371 (c)(1),
(2) Date: Dec. 6, 2021

(87) PCT Pub. No.: WO2020/249288
PCT Pub. Date: Dec. 17, 2020

(65) Prior Publication Data
US 2022/0314382 A1    Oct. 6, 2022

(30) Foreign Application Priority Data
Jun. 14, 2019 (FR) ........................ 1906380

(51) Int. Cl.
*B23Q 1/34* (2006.01)
*B06B 1/06* (2006.01)
(Continued)

(52) U.S. Cl.
CPC .............. *B23Q 1/34* (2013.01); *B06B 1/0607* (2013.01); *B23B 47/34* (2013.01); *B23Q 1/64* (2013.01);
(Continued)

(58) Field of Classification Search
CPC ... B23Q 1/34; B23Q 1/64; B23Q 1/70; B23Q 11/127; B23Q 2705/14; B23B 47/34; B23B 2260/108; B06B 1/0607
See application file for complete search history.

(56) References Cited

U.S. PATENT DOCUMENTS 2,452,211 A * 10/1948 Rosenthal .............. B28D 5/047
451/37
3,561,462 A    2/1971 Jugler
(Continued)

FOREIGN PATENT DOCUMENTS

| DE | 202016102124 U1 | 8/2016 |
|---|---|---|
| EP | 1004783 A2 | 5/2000 |
| WO | 2017087377 A1 | 5/2017 |

OTHER PUBLICATIONS

Written Opinion for PCT/EP2020/060815 mailed Jul. 31, 2020 (9 pages).
(Continued)

*Primary Examiner* — Eric A. Gates
(74) *Attorney, Agent, or Firm* — Shumaker, Loop & Kendrick, LLP

(57) ABSTRACT

Spindle for carrying out machining assisted by non-ultrasonic axial oscillations, including a tool-bearing shaft, and an exciting portion, for subjecting the shaft to non-ultrasonic axial oscillations, especially during its rotation. The exciting portion including a first exciting stage, having at least one piezoelectric actuator, and a second exciting stage, having at least one piezoelectric actuator, having a non-zero axial overlap with the first exciting stage, the actuators of the two stages being arranged so that their effects add.

24 Claims, 6 Drawing Sheets

(51) Int. Cl.
  *B23B 47/34* (2006.01)
  *B23Q 1/64* (2006.01)
  *B23Q 1/70* (2006.01)
  *B23Q 5/32* (2006.01)
  *B23Q 11/12* (2006.01)

(52) U.S. Cl.
  CPC ............... *B23Q 1/70* (2013.01); *B23Q 5/32* (2013.01); *B23Q 11/127* (2013.01); *B06B 2201/73* (2013.01); *B23B 2260/108* (2013.01); *B23Q 2705/14* (2013.01)

(56) References Cited

U.S. PATENT DOCUMENTS

| | | |
|---|---|---|
| 6,422,757 B1 | 7/2002 | Wu et al. |
| 8,240,396 B2 | 8/2012 | Sauer |
| 2011/0022297 A1 | 1/2011 | Hindman |
| 2016/0012950 A1 | 1/2016 | Nishino et al. |
| 2017/0136552 A1 | 5/2017 | Fairchild et al. |

OTHER PUBLICATIONS

International Search Report (ISR) for PCT/EP2020/060815 mailed Jul. 31, pages).

\* cited by examiner

[Fig.1]
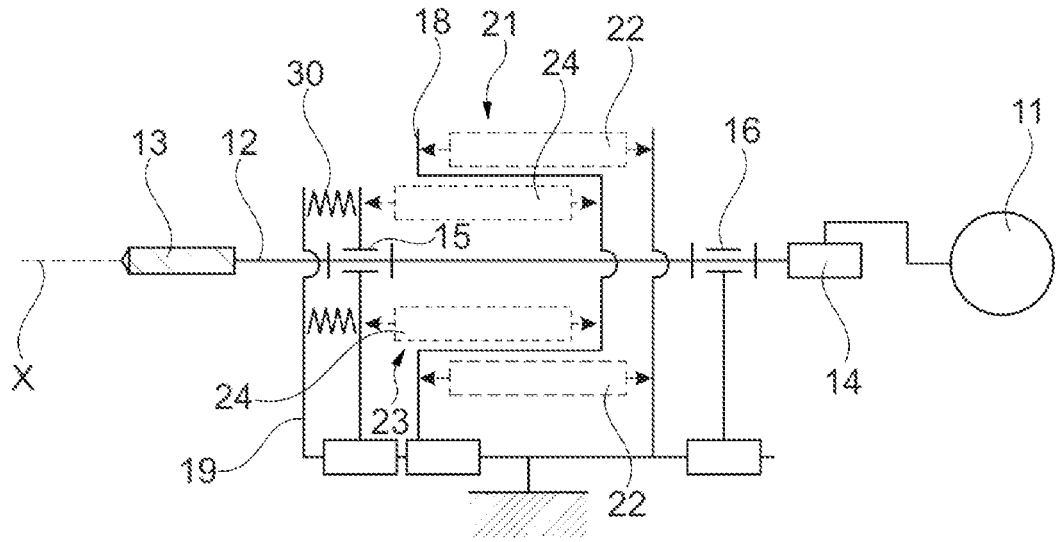
[Fig.2]
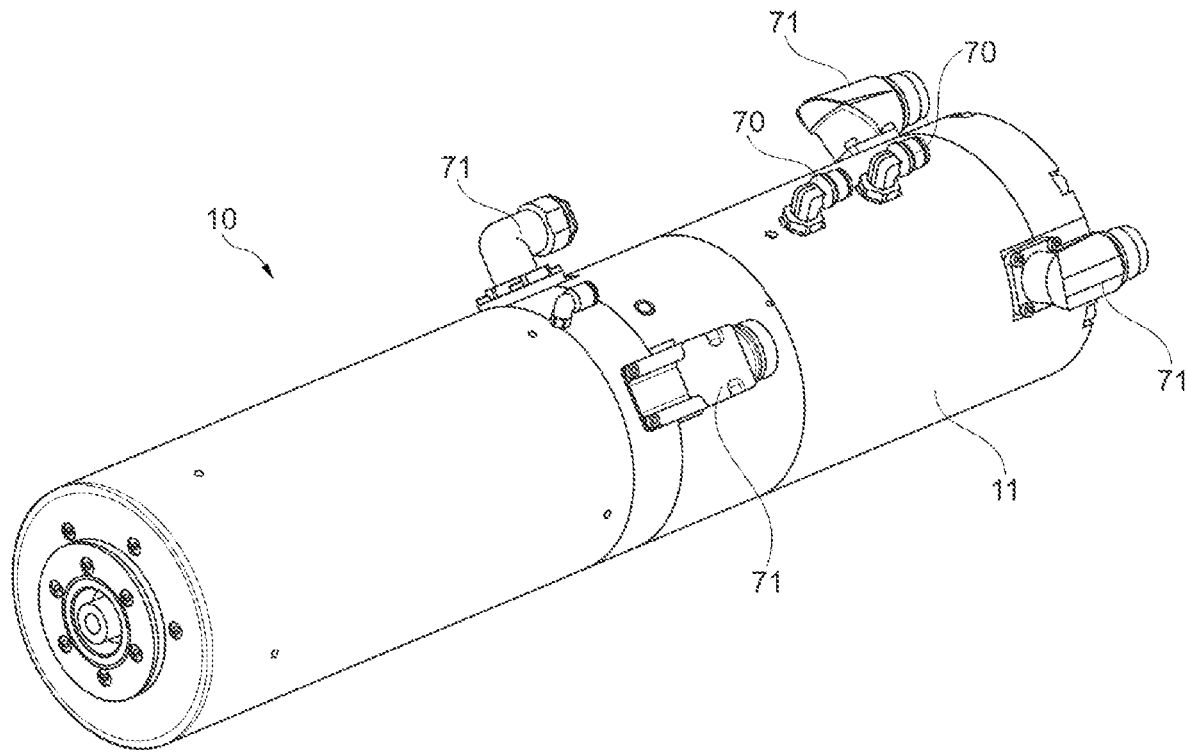

[Fig.3]
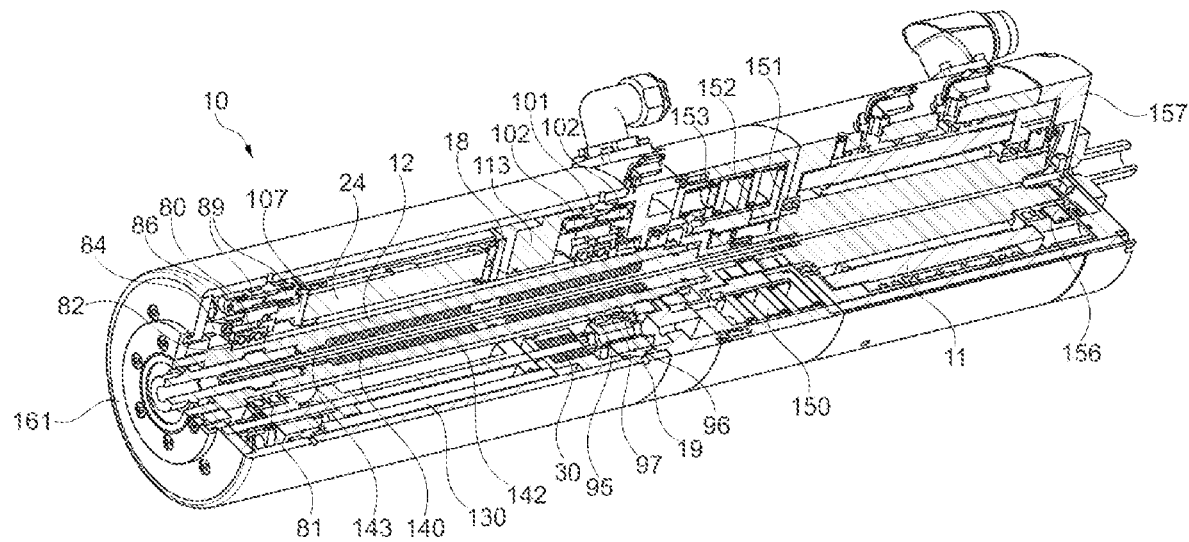
[Fig.4]
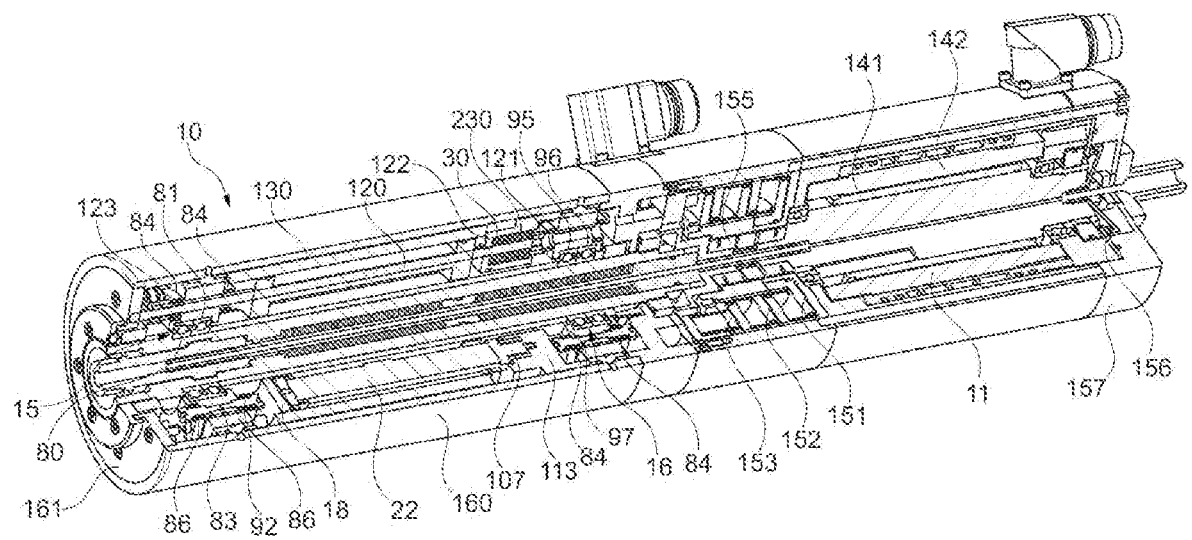

[Fig.5]
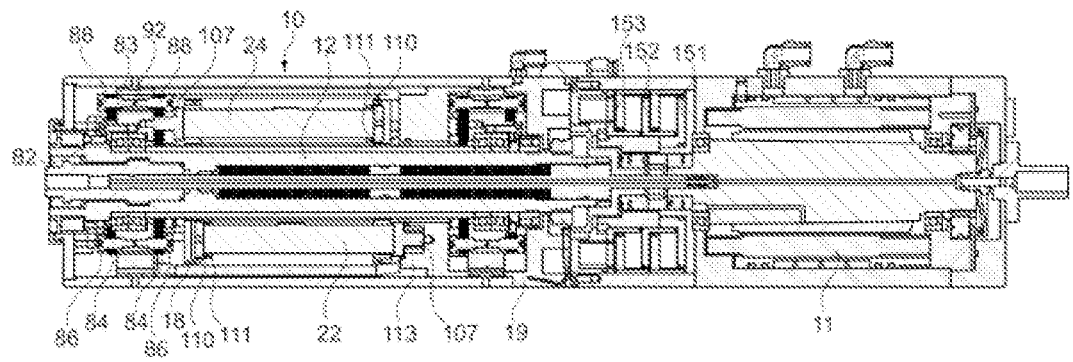
[Fig.6]
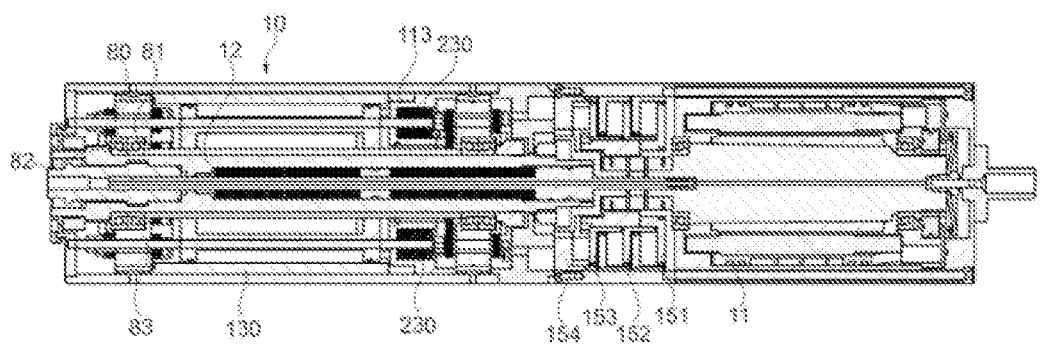
[Fig.7]
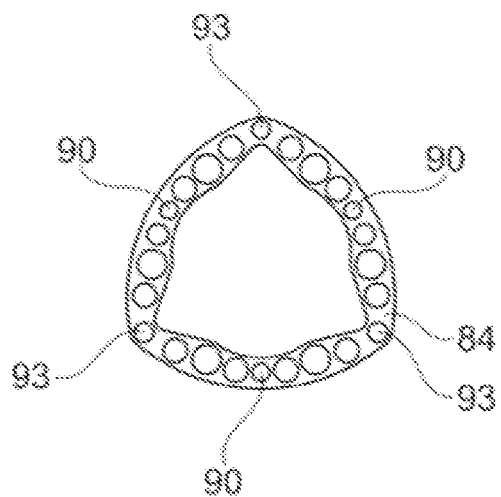

[Fig.8]
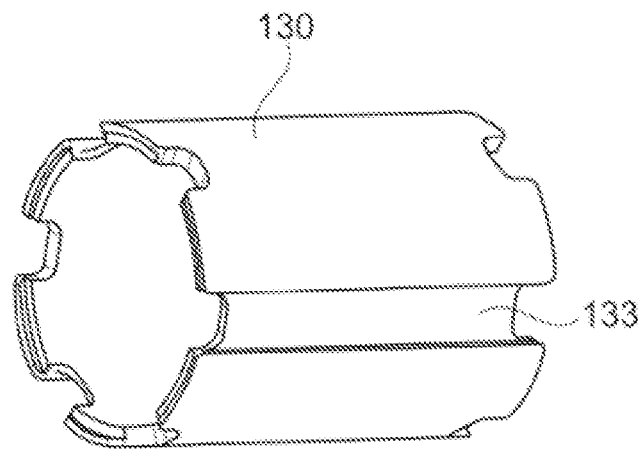
[Fig.9]
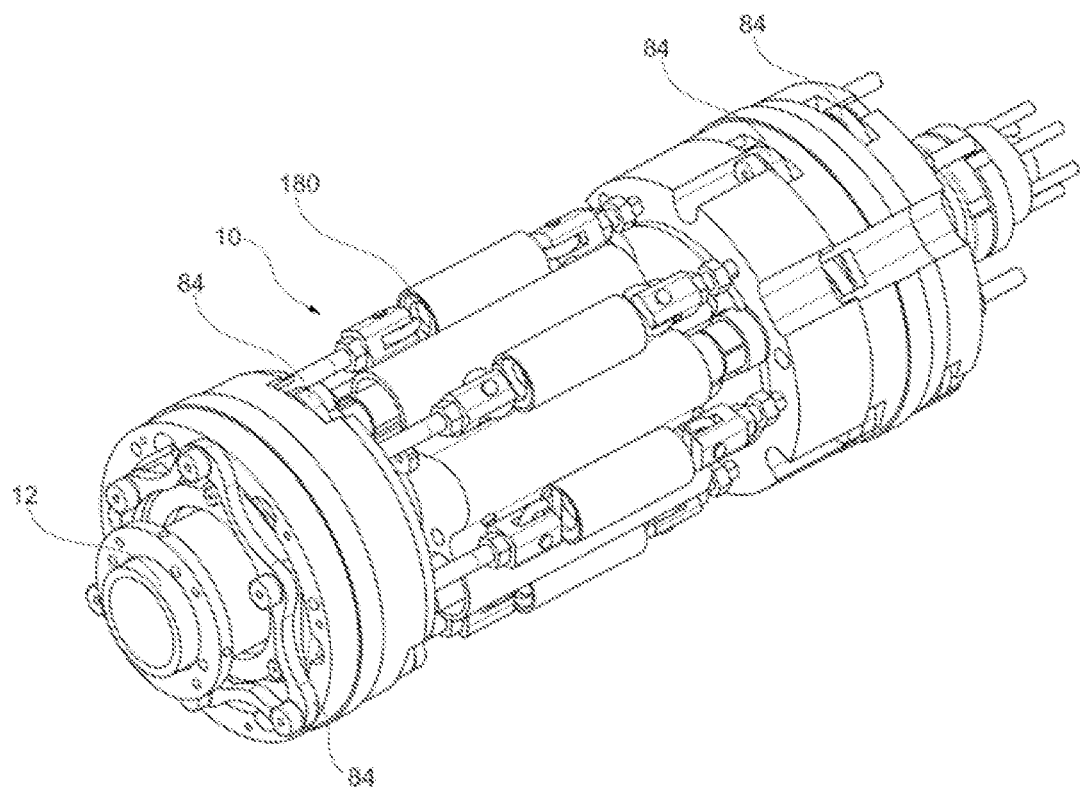

[Fig.10]
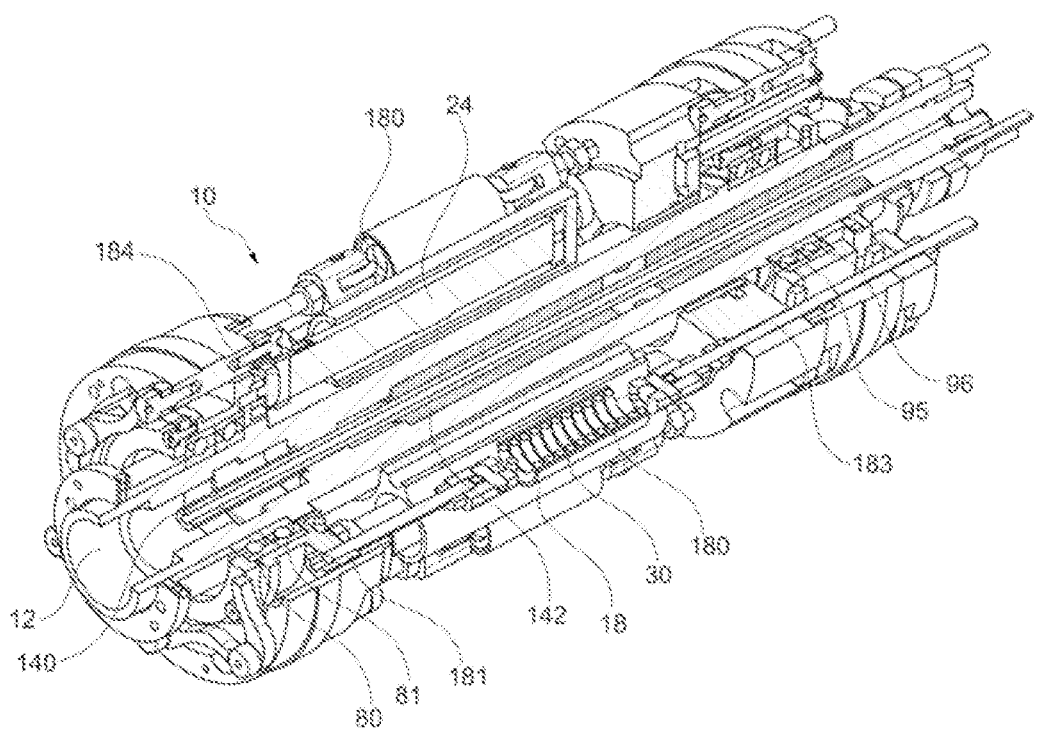
[Fig.11]
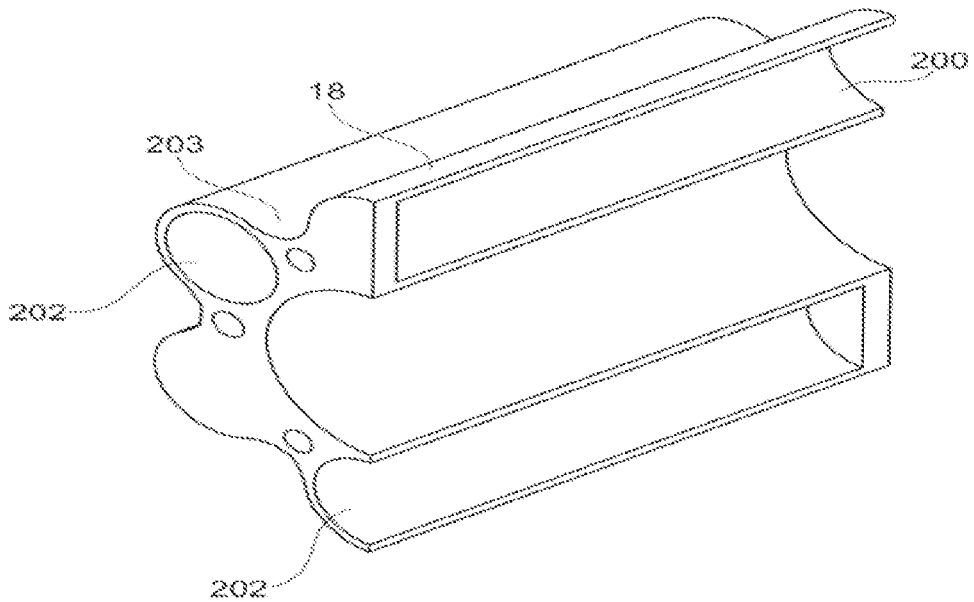

[Fig.12]
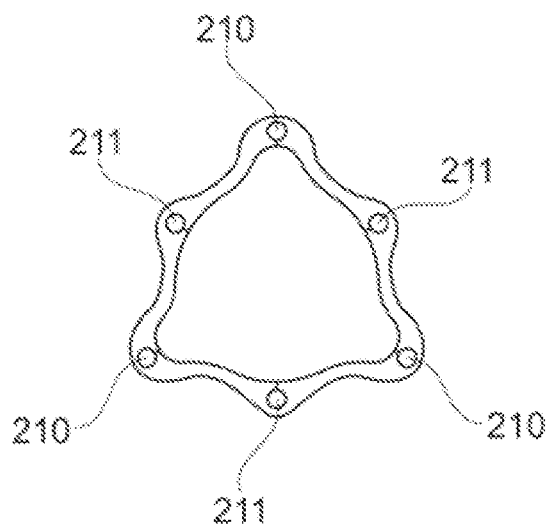

SPINDLE WITH PIEZOELECTRIC ACTUATORS

TECHNICAL FIELD

The present invention relates to a spindle for a machine-tool or a robot.

BACKGROUND

Machine-tools, in particular those said to be numerically controlled, comprise a mobile support, notably mobile in three directions, holding an electric spindle, which is a spindle equipped with a motor and a tool-holder, in order to drive it in rotation about its axis.

It has already been proposed to subject a tool driven in rotation to ultrasound vibrations ("Ultrasonic Machining" or UM) to increase the effectiveness of the tool and allow hard materials such as glass to be drilled. The ultrasound vibrations make it possible to create shearing in the cutting but have no notable influence on the thickness and the discharging of the chips.

The application US 2011/0222975 describes a UM module comprising a transducer arranged to receive the tool. This transducer is powered by revolving electric contacts.

The patent U.S. Pat. No. 3,561,462 describes another example of UM spindle comprising an ultrasound exciter operating at a frequency of the order of 16 to 20 kHz, also requiring revolving contacts.

The patent U.S. Pat. No. 8,240,396 discloses another UM spindle comprising revolving piezoelectric elements, with an excitation frequency ranging from 17 to 60 kHz.

Moreover, it is known practice to use piezoelectric actuators in spindles to produce a variable preloading, in order to compensate for mechanical stresses that appear in operation in rolling bearings, because of the expansion due to the rising temperature in operation.

The patent U.S. Pat. No. 6,422,757 and the application EP 1004783 thus disclose spindles equipped with a piezoelectric actuator for this purpose. The application EP 1004783 teaches using the piezoelectric actuator in combination with a cylinder in order to increase the axial compensation travel of the preloading.

Moreover, it is known practice, during a drilling operation, to submit the tool to axial oscillations whose frequency is linked to the rotation frequency. These axial oscillations are of a frequency much lower than in the case of ultrasound machining UM and aim essentially to fragment the chips which are generated by the tool during its rotation.

Conventionally, the frequency of these axial oscillations goes from 5 Hz to 500 Hz, depending on the speed of rotation.

It has already been proposed to generate these oscillations using a piezoelectric actuator in the application WO 2017/087377 A1. However, this application remains brief in the implementation thereof.

US2016/0129505 describes a system that allows a feed of the tool to be produced automatically as a function of its rotation, equipped with an electromechanical actuator, which can be piezoelectric, to superimpose axial oscillations on the feed movement. This application remains silent on the practical implementation of the piezoelectric actuator.

Now, the use of piezoelectric elements to reliably generate axial oscillations and modify the instantaneous trajectory of the tool in order to fragment chips poses many problems which have to be resolved in a way that is compatible with the industrial use of the spindle.

First of all, the piezoelectric elements are relatively brittle and need to work under load; it is therefore necessary to provide a suitable loading system.

Then, the elongation of a piezoelectric element when electrically excited is relatively low, of the order of $\frac{1}{1000}$, whereas the amplitude of the axial oscillations necessary to obtain the fragmentation of a chip is not negligible. It is therefore necessary to find a means for obtaining the required amplitude. Furthermore, a piezoelectric actuator of great length is subject to a risk of buckling under high axial strain.

Moreover, the thermal energy dissipated by a piezoelectric actuator at high frequencies is not negligible and must be discharged.

Finally, the electrical power supply of the piezoelectric elements also poses a difficulty, because it needs to be reliable over time and not raise maintenance problems.

Independently of the problems linked with the use of piezoelectric actuators, the spindle needs to remain sufficiently compact to be able to be used on a numerically-controlled machine-tool, and it needs to operate over the most extensive possible range of rotation speeds, preferably up to 15 000 or 18 000 rpm, in order to be able to address the greatest number of applications.

Now, in the case of the discharging of the chips, the frequency of the axial oscillations is linked to the rotation frequency and increases therewith. However, at high frequencies, the inertia of the moving parts causes a significant increase in the power necessary to the generation of the axial oscillations.

There is consequently a need to have a spindle that makes it possible to generate axial oscillations using piezoelectric elements that addresses these various constraints.

EXPLANATION OF THE INVENTION

The invention thus aims to use piezoelectric elements to generate non-ultrasonic axial oscillations in a spindle (which is preferably an electric spindle) in order to enhance the machining performance and notably improve the discharging of the chips.

SUMMARY OF THE INVENTION

The invention aims to address this need, and its subject, according to a first of its aspects, is a spindle for performing machining assisted by non-ultrasonic axial oscillations, comprising:
- a tool-holding shaft, and
- an exciter part, for subjecting the shaft to non-ultrasonic axial oscillations, notably during its rotation, this exciter part comprising:
  - a first exciter stage, comprising at least one piezoelectric actuator,
  - a second exciter stage, comprising at least one piezoelectric actuator, having a non-zero axial overlap with the first exciter stage, the actuators of the two stages being disposed so as to add together their effects.

The two stages can be coupled by a link member against which the actuators of each stage bear at one end, such that the actuators of one stage have one end, bearing on this link member, which is fixed with respect to an end of the actuators of the other stage, by bearing also on this link member in such a way that the elongation of the actuators of the first stage is added to that of the actuators of the second stage.

In a preferred implementation of the invention, the spindle comprises:
- a body,
- a front bearing that is at least partially axially mobile relative to the body,
- a rear bearing that is at least partially axially mobile relative to the body,
- the tool-holding shaft being axially mobile relative to the body, the at least partial axial displacement of the bearings being accompanied by an axial displacement of the tool-holding shaft,
- the first exciter stage, preferably static, acting between an intermediate link member and the body,
- the second exciter stage, preferably static, acting between one of the bearings and the intermediate link member.
- "Static" should be understood to mean not revolving relative to the body, as opposed to the rotation of the tool relative to the body. "Static" is thus synonymous here with "non-rotary".

"Non-ultrasonic" should be understood to mean that the frequency of the axial oscillations is well below those of the ultrasound-assisted machining ("Ultrasonic Machining"), therefore well below 16 kHz. The effect of the axial oscillations is, in the invention, to modify the instantaneous trajectory of the tool to fragment chips.

"Front bearing" designates the bearing closest to the tool. "Bearing" should be understood to mean the part or parts which ensure the function of rotational guidance of the shaft. The bearing can thus comprise rolling bearings and the support of these rolling bearings to hold them relative to the body of the spindle.

"Non-zero axial overlap" should be understood to mean that the piezoelectric actuators occupy at least a band of common abscissae along the longitudinal axis of the spindle.

The two stages of actuators can add together their effects when excited electrically, inasmuch as the elongation of the actuators of one of the stages can be added to that of the actuators of the other stage.

The actuators of the second stage can be interposed axially between one of the bearings and the intermediate link member. The actuators of the first can be interposed axially between the intermediate link member and the body.

The invention allows for a particularly elegant and effective resolution of the many problems explained above posed by the use of piezoelectric elements in a spindle.

First of all, the axial overlap between the exciter stages makes it possible to keep a longitudinal bulk of the spindle compatible with the use in numerically-controlled machines, while having lengths of piezoelectric actuators that are sufficient to obtain the amplitude sought for the axial oscillations.

Then the presence of the two stages makes it possible to excite just one at the high rotation frequencies, in order to reduce the number of moving parts and the corresponding inertia, and therefore the necessary energy. That makes it possible, for a given power, to be able to generate axial oscillations with a higher frequency.

The limited longitudinal bulk of the exciter part according to the invention also makes it possible to easily incorporate an electric motor in the spindle in order to make it an electric spindle.

The body of the spindle can be formed by one or more parts assembled together.

Preferably, each stage of the exciter part comprises several piezoelectric actuators, for example between 2 and 4, notably 3. These actuators are advantageously identical and have longitudinal axes that are parallel to one another and to the axis of rotation.

Preferably, the piezoelectric actuators of one stage alternate, in an angularly equally distributed manner, about the longitudinal axis of the spindle, with those of the other stage. That allows for a good distribution of the loads.

Preferably, the spindle comprises an axial preloading system for stressing the tool-holding shaft by axial displacement that is the reverse of that provoked by the excitation of the actuators. That makes it possible to keep the piezoelectric elements under compression.

This preloading system can be interposed axially between the body and one of the bearings, preferably the front bearing. As a variant, it is interposed between the body and the rear bearing.

The preloading system can comprise at least one elastic return member working by compression, and comprise, for example, several sets of elastic washers disposed in recesses of a part that is fixed relative to the body of the spindle. Each set can come to bear at one end in the bottom of the recess. The preloading system can comprise at least one tie-rod linked at one end to one of the bearings, preferably the front bearing, and coming to bear at the other end against the set of washers on the side of the opening of said recess. Thus, the set of elastic washers works by compression to stress the bearing in the direction of compression of the piezoelectric actuators.

In a variant, the preloading system comprises springs working by traction. These springs are for example attached at one end at a fixed point relative to the body, and at the other end to one of the bearings, preferably the front bearing, to stress it to bear against the piezoelectric actuators and thus subject the latter to an axial compression force.

The intermediate link member preferably comprises recesses that are alternately open toward an axial end of the spindle and toward the opposite end, the piezoelectric actuators being received in these recesses. This link member can be of a single piece or formed by the assembly of several parts. Within each recess, the corresponding piezoelectric actuator can come to bear axially in a part provided with a centering O-ring seal, disposed in the bottom of the recess.

Preferably, at least one of the bearings, and, better, each bearing, comprises at least one rolling bearing held by a flexible support that can bend under the effect of the force generated by the piezoelectric actuators to allow an axial displacement of the shaft, while keeping the radial position of the rolling bearing unchanged relative to the body.

The use of such supports is advantageous, because it reduces the inertia of the parts to be set in motion axially to produce the axial oscillations, and limits the use of rolling bearings or other guiding means.

The flexible support advantageously has a lamellar structure with platelets oriented transversely, notably at right angles, to the axis of rotation of the shaft. These plates are advantageously introduced by cutting sheet metal. Their thickness ranges for example from 0.1 to 1 mm and their numbers range from 10 to 50 per support.

The supports can be given various forms, notably in order to increase the flexibility and/or allow the passage of tie-rods, cables or cooling air streams. Apertures can also be produced in the supports so as to give greater flexibility.

Centering screws can be provided bearing on the supports so as to refine the centering thereof, if necessary.

Each support can be fixed on the one hand to the body at fixing points, and, on the other hand, at locations that are angularly offset from said fixing points about the axis of rotation of the shaft, to a rolling bearing housing.

For example, the supports have, when seen from the front, a generally triangular form, allowing the body of the spindle to be fixed at the vertices of the triangle and the rolling bearing housing of the bearing to be fixed midway along the sides of the triangle. In a variant, the supports have a corrugated form in the circumferential direction.

Preferably, each bearing comprises two flexible supports disposed on either side of the rolling bearing or bearings.

Each bearing preferably comprises two ball bearings, disposed side-by-side.

Each stage of the piezoelectric actuators preferably comprises between 2 and 4 actuators, better, 3 actuators.

Each piezoelectric actuator can transmit its thrust, at at least one of its axial ends, via a flexible transmission part, for example in the form of a T with a widened part in section, the piezoelectric actuator coming to bear upon this flexible piece, notably on the widened part of the piece. The elongate part of the piece, through its flexibility, allows swiveling. As a variant, a transmission system comprising a spherical reach is used. The advantage of the T-shaped transmission part is its machining simplicity, compared to a spherical reach. The opposite ends of the actuators can be received in centering pieces provided with an O-ring seal pressing on the outer surface of the actuators, as mentioned above.

Preferably, the piezoelectric actuators are cooled by a circulation of compressed air.

The spindle can comprise a spacer-forming sleeve, surrounding the piezoelectric actuators, the front bearing coming axially to bear against this sleeve. That simplifies the mounting of the bearing. This sleeve can have longitudinal grooves on its radially outer surface, in which electrical power supply cables of the actuators and/or linked to sensors are engaged. The sleeve, when metallic, can offer an additional shielding with respect to the electromagnetic radiation generated by the piezoelectric actuators, notably with respect to the cables which run in said grooves and are linked for example to sensors.

The spindle can comprise a release system for acting on the clamping of the tool-holder, this release system being preferably disposed between the motor and the piezoelectric actuators. The release system can be pneumatic and comprise several successive pressure chambers, for example three chambers, in order to obtain a greater actuation force for a given pressure. That makes it possible to reduce the radial bulk of the release system, and facilitates its installation between the exciter stages and the motor. Such a positioning of the motor behind the release system simplifies the production of the motor, the shaft of which can be solid, except for a cutting oil intake channel, which can also be produced more easily.

Another subject of the invention, according to another of its aspects, is a drilling or form-machining method, in which a tool is driven in rotation using the spindle according to the invention, and in which the tool is subjected simultaneously to its rotation to non-ultrasonic axial oscillations, by periodically exciting the piezoelectric actuators.

The two stages of actuators can be excited simultaneously. That makes it possible to have a maximum amplitude of axial oscillations, the elongations of the actuators being aggregated.

Preferably, the actuators are excited by a sinusoidal voltage. The frequency of the axial oscillations can lie between 0 and 350 Hz.

Each stage of actuators can be powered by a power stage which is specific to it.

It is also possible for a single stage of actuators to be excited, in particular that acting between the front bearing and the link member. That makes it possible to operate for a given power at a higher excitation frequency, by reducing the inertia of the parts set in motion axially during these oscillations.

In this case, the stage of actuators which does not oscillate can be not powered or powered with a fixed voltage chosen to provide a finer compensation of the displacement of the rotor.

The spindle can be mounted on a numerically-controlled machine or an effector.

The spindle is then conventionally displaced axially during the drilling or form-machining, and the feed per revolution of the spindle and the peak-to-peak amplitude of the axial oscillations are of the same order of magnitude (that is to say that there is at most a factor of 10 between the two).

The method can be a method for the drilling assisted by non-vibratory vibrations of a metal, notably of aluminum or of titanium or of other metals or materials, during which the vibratory parameters will be able to be adjusted (amplitude and frequency).

The method can also be a form-machining, notably countersinking or spot facing. In this case, the axial oscillations will be able to be stopped before the end of the feed of the tool.

It is also possible to generate axial oscillations without rotation in order, for example, to perform an amplitude measurement on the tool or assist in the removal thereof.

BRIEF DESCRIPTION OF THE DRAWINGS

The invention will be able to be better understood on reading the following description, of nonlimiting examples of implementation thereof, and on studying the attached drawing, in which:

FIG. 1 is a kinematic diagram of an example of a spindle according to the invention, FIG. 2 represents, schematically and in perspective, an example of a spindle according to the invention, FIG. 3 is a view similar to FIG. 2 with partial cutaway, FIG. 4 is a view similar to FIG. 3, in other cutting planes, FIG. 5 is a longitudinal cross-section of the spindle, FIG. 6 is a view similar to FIG. 5 in a cutting plane at right angles to that of FIG. 5, FIG. 7 represents, in isolation by a front view, one of the supports of the rolling bearings, FIG. 8 represents, in isolation, a part of the frame of the spindle, FIG. 9 is a perspective, schematic and partial view of a variant embodiment of the spindle, FIG. 10 is a view similar to FIG. 9 with partial cutaway, FIG. 11 represents, in isolation in axial cross-section, the link member between the two stages of piezoelectric actuators, and FIG. 12 is a view similar to FIG. 7 of a variant embodiment of the support of a bearing.

DETAILED DESCRIPTION

An example of a spindle 10 according to the invention will now be described with reference to FIG. 1.

The spindle 10 is, here, an electric spindle, because it incorporates an electric motor 11, for example a synchronous motor with permanent magnets.

This motor 11 drives a shaft 12 in rotation by a link 14 allowing a certain axial clearance with the latter, sufficient to allow the shaft to oscillate axially along its longitudinal axis with the desired amplitude.

The shaft 12 drives, at its end opposite the motor 11, a tool-holder 13, which can receive any type of tool, for example a drill bit or any other tool intended for form-machining for example, represented schematically in FIG. 1.

The interface between the tool-holder and the tool can be of clamp type, and be produced according to various standardized or proprietary standards, for example be of ER or D type, among others.

The tool can also be held on the tool-holder by hydraulic clamping, thermal shrinking, mechanical shrinking or transmission by obstacle, of Weldon or Wissonnotch type, among others.

The interface between the tool-holder and the spindle can also be governed by proprietary norms or standards, for example be of HSK, BIG, CAPTO, BT or ISO (SK40) type, or use Morse taper, this list being non-limiting.

The interface between the spindle and the numerically-controlled machine can be made by clamping or any other suitable way.

Front 15 and rear 16 bearings guide the shaft 12 in rotation while allowing axial movement.

These bearings 15 and 16 are axially mobile, at least on the shaft 12, with respect to the body 19 of the spindle 10.

The latter comprises a first exciter stage 21 comprising several piezoelectric actuators 22 acting in parallel between the body 19 and a link member 18 that is mobile relative to the body 19 and a second exciter stage 23 comprising several piezoelectric actuators 24 acting between the link member 18 and one of the bearings, in this particular case the front bearing 15 in the example considered.

An elastic preloading system 30 is interposed axially between the body 19 and one of the bearings, in this particular case the front bearing 15, to maintain the piezoelectric actuators 22 and 24 with the necessary prestressing.

As can be seen in FIG. 1, the link member 18 is arranged to allow a certain axial overlap of the piezoelectric actuators along the longitudinal axis X of the spindle 10.

The actuators 22 and 24 do not revolve relative to the body 19, which simplifies their electrical power supply and makes it possible to avoid the use of revolving slip rings.

They are linked to a control system delivering a variable voltage in order to cause them to oscillate in conjunction with the rotation of the shaft 12, so as to have a sufficiently accurate trajectory of the tool as a function of the application sought.

The actuators 22 and 24 are powered for example by two respective amplifiers.

At the low rotation frequencies, the actuators 22 and 24 are all powered and their elongations are aggregated, which makes it possible to obtain a maximum amplitude of axial oscillation of the tool. The actuators 22 and 24 are preferably excited with a sinusoidal voltage, of frequency and phase chosen as a function of rotation frequency of the tool and its angular phase.

At the higher rotation frequencies, in order to reduce the inertia of the moving parts, only the second stage 23, closest to the front bearing, is excited, and the link member 18 is axially immobile.

The spindle 10 according to the invention preferably satisfies the following relationships.

Frequency of the axial oscillations generated by the piezoelectric actuators: 0 to 500 Hz, better, 0 to 350 Hz, the rotation frequency $\omega_{rotation}$ of the tool: 0 to 18 000 rpm, peak-to-peak amplitude of the axial oscillations: 0 to 0.25 mm, better, 0.02 to 0.25 mm, the ratio of the frequencies $\omega_{axial\ oscillations}/\omega_{rotation}$ is preferably non-integer, and is for example 1/2, 3/2, 5/2 or 7/2, if f designates the feed per revolution, that is to say the axial displacement of all of the spindle for a 360° rotation of the tool, preferably 1/10 f<a<10 f, in which a designates the peak-to-peak amplitude of the axial oscillations, f preferably lies between 0.01 and 0.5 mm.

The control system of the piezoelectric actuators can be arranged to allow an activation of the axial oscillations over the entire machining phase or, as a variant, over only a part thereof, with deactivation of the oscillations at the end of the machining, in accordance with the method that is the subject matter of the patent EP2790860 of the applicant.

In the diagram illustrated in FIG. 1, the bearings 15 and 16 are axially mobile relative to the body 19. The bearings 15 and 16 can be produced in such a way as to have a deformable part allowing an axial displacement of the shaft while accurately guiding the latter in rotation, as will be described later.

FIGS. 2 to 6 represent an example of a spindle 10 produced in accordance with the invention.

This spindle 10 is an electric spindle, its motor 11 being housed in a casing provided with different fluidic connections (liquid and/or gas) 70 and electrical connections 71, which ensure the cooling of the spindle, the electrical power supply of the motor and of the piezoelectric actuators, the control of the tool-holder and the exchange of signals with various sensors. In particular, in the example considered, the spindle comprises engine cooling water intake and outlet connections and a cooling compressed air intake for the piezoelectric actuators.

In this example, the front bearing 15 comprises two ball bearings 80 and 81, coming into axial abutment at one end against a shoulder 82 of the shaft 12 and at the other end against a housing 83. The latter is fixed by screws 86 against two supports 84 disposed on either side of the housing 83.

Each support 84 is formed by a superposition of metal sheets having, for example, the substantially triangular form given in FIG. 7, so as to exhibit a great rigidity in the thicknesswise direction thereof and a certain flexibility in a direction at right angles to the plane of the metal sheets. The screws 86 pass through openings 90 present midway along the sides of the support 84.

The supports 84 are fixed also by screws 88 to an element 92 forming part of the body 19 of the spindle 10, through openings 93 present at their vertices, as visible in FIG. 7.

The flexibility of the supports 84 allows the axial clearance of the housing 83 necessary to allow the axial oscillations of the shaft 12, while keeping the housing 83 centered relative to the body 19 of the spindle 10.

The rear bearing 16 has a similar construction, with ball bearings 95 and 96 bearing at one end against a shoulder of the shaft 12 and at the opposite end against a housing 97.

Two supports 84 identical to those of the front bearing are fixed to this housing 97 through the openings 90. The supports 84 of the rear bearing are immobilized on an element 101 of the body of the spindle by screws 102 engaged in the openings 93 of the supports 84.

As for the front bearing, the flexibility of the metal sheets of the supports 84 allows an axial clearance of the rear bearing at the rolling bearings 95 and 96, while ensuring the centering thereof.

The piezoelectric actuators 24 come to bear, via transmission parts 107 that are T-shaped in axial section, allowing a distribution of the load over the entire front face of the actuators and a compensation of any misalignment, against the housing 83 of the front bearing. The actuators 24 of one of the stages come to bear at the rear, via a part 110, against the link member 18. The part 110 can comprise, as illustrated, a seal 111 for centering the actuator.

The mounting of the actuators 22 of the other stage is similar, as can be seen notably in FIG. 5, the latter coming to bear at the rear by the transmission parts 107 against a bearing part 113 forming part of the body 19 of the spindle, and at the front against the link member 18. The bearing part 113 is hollow and houses a preloading system 30 consisting, in the example considered, of stacks of Belleville washers passed through by respective tie-rods 120.

Each stack of elastic washers 230 is compressed between a nut 121 engaged on the tie-rod 120 and the bottom 122 of the recess of the bearing part 113 which receives it, as can be seen notably in FIG. 4.

Each tie-rod 120 comes to bear via a nut 123 on the front face of the housing 83 and thus exerts a rearward-directed tension thereon.

Each tie-rod passes through the supports 84 freely through the openings produced in the latter between those serving as passages for the abovementioned fixing screws.

The elastic washers 230 thus ensure the necessary preloading of the piezoelectric actuators. A spacer-forming metal part 130, in sleeve form, is disposed around the link member 18, coming to bear axially at one end against the bearing part 113 and at the other end against the fixing element 92.

This spacer-forming part 130 can comprise, as illustrated in FIG. 8, longitudinal grooves 133 on its radially outer surface, for running electrical power supply cables of the piezoelectric actuators and/or cables linked to sensors.

These grooves 133 can also facilitate the circulation of cooling air in the spindle 10.

The shaft 12 is hollow, and passed through longitudinally by an actuation rod 140 of the tool-holder mounted on the spindle 10. The rod 140 is also hollow for cutting fluid to be brought to the tool.

The rod 140 is maintained in locking position by a stacking of elastic washers 142, coming to bear axially against a shoulder 143 of the shaft 12.

To unlock the tool (not represented), a forward thrust is exerted on the rod 140 by a pneumatic unlocking system 150, comprising three chambers 151, 152 and 153 aggregating their effects on a transmission part 154.

In the example illustrated, this unlocking system 150 is situated axially between the exciter part situated at the front of the spindle comprising the piezoelectric actuators and the motor 11.

The latter comprises a rotor with permanent magnets 141 and a stator 142, liquid-cooled. The shaft of the rotor 141 is linked to the shaft 12 of the spindle 12 by an elastic coupling system 155, allowing a transmission of the torque and an axial clearance between the two shafts. This system 155 comprises two metal parts having teeth which fit together in the manner of a claw, with elastomer cushions between the teeth.

The motor 11 comprises, at the rear, a coder 156, which makes it possible to accurately know the angular position of the shaft. The piezoelectric actuators are advantageously driven as a function of the information supplied by this coder.

The spindle 10 comprises a cylindrical casing 160 in several sections, closed at the front by a front flange 161 and at the rear by a rear flange 157 housing the coder 156.

Obviously, numerous modifications can be made to the spindle 10 without departing from the framework of the present invention.

A variant spindle 10 which differs from that which has just been described by the way in which the preloading of the piezoelectric actuators is ensured will now be described with reference to FIGS. 9 to 12.

In this example, the preloading system 30 comprises helical springs 180, working by tension between a ring 181 being displaced axially with the rolling bearings 80, 81 of the front bearing and tie-rods 183 that are fixed relative to the body of the spindle 10.

The actuators 24 come to bear at the front against the front bearing via transmissions with spherical reaches 184 and at the rear against the link member 18.

The latter is represented in isolation in FIG. 11.

Here it takes the form of a single-piece part comprising recesses 200 that are open toward the rear, to receive the piezoelectric actuators 22, and recesses 202 that are open toward the front, for receiving the actuators 24. Grooves 203 are formed on the outside of the part to receive the springs 180.

The front and rear bearings have supports 84 whose form, illustrated in FIG. 12, differs from that of the supports 84 of the example described previously.

The supports 84 have a corrugated form, with openings 210 allowing the passage of screws for axial immobilization on the body of the spindle 10, and openings 211 for the passage of fixing screws for the rolling bearing housing.

The hollows formed between the openings 210 and 211 allow electrical cables to be run, if necessary.

In this example, the motor 11, not represented, is situated just behind the rear bearing, the tool-holder release system being situated right at the back of the spindle 10, after the motor 11.

Other modifications can be made to the spindle without departing from the framework of the present invention.

For example, the spindle no longer comprises a motor but is driven by a pulley and a motor that is remote from the machine.

The spindle can be used on a robotized arm rather than a numerically-controlled machine.

The ball bearings can be replaced by roller bearings.

The invention claimed is:

1. A spindle for performing machining assisted by non-ultrasonic axial oscillations, comprising:
   a tool-holding shaft, and
   an exciter part, for submitting the shaft to non-ultrasonic axial oscillations, this exciter part comprising:
      a first exciter stage, comprising at least one piezoelectric actuator,
      a second exciter stage, comprising at least one piezoelectric actuator, having a non-zero axial overlap with the first exciter stage, the actuators of the two stages being disposed so as to add together their effects.

2. The spindle as claimed in claim 1, further comprising:
   a body,
   a front bearing that is at least partially axially mobile relative to the body, a rear bearing that is at least partially axially mobile relative to the body, the tool-holding shaft being axially mobile relative to the body, the at least partial axial displacement of the bearings being accompanied by an axial displacement of the tool-holding shaft, the first exciter stage, static, acting between an intermediate link member and the body, the second exciter stage, static, acting between one of the bearings and the intermediate link member.

3. The spindle as claimed in claim 2, wherein the intermediate link member comprises recesses that are alternately open toward an axial end of the spindle and toward the opposite end, the piezoelectric actuators being received in these recesses.

4. The spindle as claimed in claim 2, wherein at least one of the bearings, comprises a rolling bearing held by a flexible support that can bend under the effect of the force generated by the piezoelectric actuators to allow an axial displacement of the shaft, while keeping the radial position of the rolling bearing unchanged relative to the body.

5. The spindle as claimed in claim 4, wherein the flexible support has a lamellar structure with platelets oriented transversely to the axis of rotation of the shaft.

6. The spindle as claimed in claim 4, wherein each support is fixed on the one hand to the body at fixing points, and on the other hand, at locations offset angularly from said fixing points about the axis of rotation of the shaft, to a rolling bearing housing.

7. The spindle as claimed in claim 4, wherein each bearing comprises two flexible supports disposed on either side of the rolling bearing or bearings.

8. The spindle as claimed in claim 2, further comprising a spacer-forming sleeve, surrounding the piezoelectric actuators, the front bearing coming axially to bear against this sleeve.

9. The spindle as claimed in claim 8, wherein the sleeve has longitudinal grooves on its radially outer surface, in which electric power supply cables for the actuators and/or linked to sensors, are engaged.

10. The spindle as claimed in claim 1, wherein the piezoelectric actuators of the first exciter stage, respectively the second exciter stage, alternating, in an angularly equidistributed manner, about the longitudinal axis of the spindle, with those of the second exciter stage, respectively the first exciter stage.

11. The spindle as claimed in claim 1, further comprising an axial preloading system for stressing the tool-holding shaft in axial displacement that is the reverse of that provoked by the excitation of the actuators.

12. The spindle as claimed in claim 11, wherein the axial preloading system works by compression.

13. The spindle as claimed in claim 1, wherein each stage of piezoelectric actuators comprises between 2 and 4 actuators.

14. The spindle as claimed in claim 1, each piezoelectric actuator transmitting its thrust, at least one of its axial ends, via a flexible transmission part, the piezoelectric actuator bearing on this piece.

15. The spindle as claimed in claim 1, wherein the piezoelectric actuators are cooled by a circulation of compressed air.

16. The spindle as claimed in claim 1, further comprising a release system for acting on the clamping of the tool-holder, this release system being disposed between the motor and the piezoelectric actuators.

17. The spindle as claimed in claim 16, wherein the release system is pneumatic and comprises several successive pressure chambers.

18. A drilling or form-machining method, wherein a tool is driven in rotation using the spindle defined in claim 1, and wherein the tool is subjected, simultaneously with its rotation, to non-ultrasonic axial oscillations, by periodically exciting the piezoelectric actuators.

19. The method as claimed in claim 18, wherein the two stages of actuators are excited simultaneously.

20. The method as claimed in claim 19, wherein only a single stage of actuators are excited.

21. The method as claimed in claim 18, wherein the spindle is mounted on a numerically-controlled machine or an effector.

22. The method as claimed in claim 18, wherein the frequency of the axial oscillations lies between 0 and 350 Hz.

23. The method as claimed in claim 18, wherein the spindle is displaced axially during the drilling or the form-machining, the feed per revolution of the spindle and the peak-to-peak amplitude of the axial oscillations being of the same order of magnitude.

24. The spindle as claimed in claim 1, the exciter part is configured for submitting the shaft to non-ultrasonic axial oscillations during its rotation.

* * * * *